United States Patent Office.

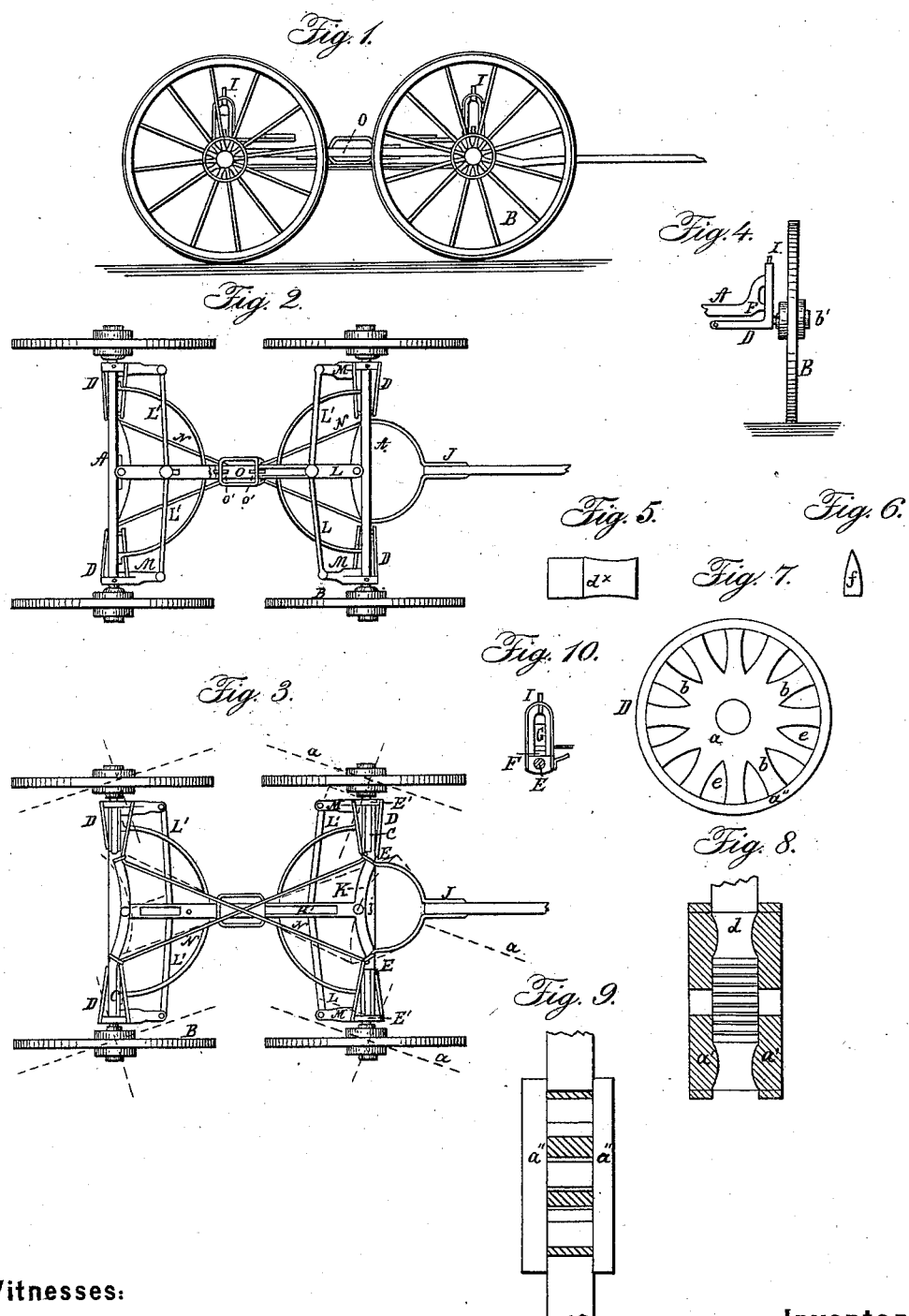

JAMES HATFIELD, OF CLEVELAND, OHIO.

Letters Patent No. 65,910, dated June 18, 1867.

---

IMPROVEMENT IN CARRIAGES.

---

The Schedule referred to in these Letters Patent and making part of the same.

---

TO ALL WHOM IT MAY CONCERN:

Be it known that I, JAMES HATFIELD, of Cleveland, in the county of Cuyahoga, and State of Ohio, have invented certain new and useful Improvements in Carriages; and I do hereby declare that the following is a full and complete description of the same, reference being had to the accompanying drawings, making a part of this specification, in which—

Figure 1 is a side view of the carriage.
Figure 2 is a top view.
Figure 3 is a view of the under side.
The other figures are detached sections to which reference will be made.
Like letters of reference refer to like parts in the several views.

A, fig. 2, is the axle-tree, to the ends of which is attached the wheel B, in the manner as follows: The wheel is provided with a rigid spindle or axle, C, fig. 3, lying between the horizontal arm of the right-angled stay D, Figure 4, and in which it is journalled in boxes E E'. The vertical arm of this stay is placed over the stake of the axle-tree, as shown in fig. 1. A detached view of the same is shown in Figure 10. Protruding from the end of the axle-tree is a lug, F, fig. 4, through which is projected a screw, G, the lower end forming a pivot on which the wheel and stay turn, and upon which the weight of the body of the carriage is supported. The vertical arm of the stay is held in position by a screw-pin, I, screwed into the top of the stake, and which serves as a pivot on which the bow of the arm turns. All the wheels are connected to the carriage in the same manner, and are operated conjointly by the following arrangement of levers and links: To the front axle-tree is attached the pole or neap, J, by a king-bolt, J', passing through the cross-rail K, fig. 3. This rail is under the reach K', and rigidly fixed to the bolt. To the upper end of this bolt is fixed an arm, L, fig. 2, to the extreme end of which are pivoted the links L'. M are brackets fixed to and projecting from the side of the stay, and to which the extreme ends of the links L' are pivoted. By this arrangement the two front stays and wheels are connected together and made to turn conjointly on moving the neap or pole in either direction, indicated by the dotted lines a, fig. 3. The hind wheels are connected to each other by exactly the same arrangement, and hence conjointly operate in the same manner. The front and hind wheels and stays are connected to each other by the links N; thus the hind wheels are operated by the front ones, and all four conjointly in either direction, as indicated by the dotted lines, the hind wheels turning laterally as to the front wheels in the act of turning the carriage around. By thus giving to the hind wheels the privilege of a lateral movement in concert with the lateral movement of the front ones, much less room is required to turn around the carriage, and thus avoid the necessity of employing small front wheels and the bolstering up the axle-tree for the purpose of levelling the body of the carriage. As in this carriage the wheels are all of a size, and the axle-trees the same distance from the ground, it also allows the carriage to be run backwards with the advantage of turning more abruptly as in moving forward. The reach K' is in two parts, which are connected to each other at the middle by a swivel-joint, O, fig. 2. By this joint the carriage readily and easily adapts itself to uneven ground, hence there is thrown no undue strain upon the wheels or any one part of the gear. The hub of the wheel of this carriage consists of a pair of iron centres, $a'$, Figure 7, with radial arms, $b$, around which is a strong band of wrought iron, $a''$, Figure 9. It will be seen that the sides of these arms facing each other are concave, and thus forming a cone-shape opening, $e$, between them, with the point of the cone directed inward. Also the inner sides of the arms are convexed, as shown in Figure 8. $a'$, Figure 5, is a section of a spoke, $d$, the tenon of which is so shaped with concave sides as to conform to the curvature of the arms, and between which it is placed, as shown in fig. 8, in which it will be seen that the concaved edges of the tenon are filled by the convexed side of the radial arms. The spokes, on being placed between the arms, are secured therein by a key or wedge, $f$, Figure 6. The shape of the sides of this key is such as to fit the sides of the tenon of the spoke and fill the openings between the radial arms, into which it is driven, and through the hub, thus keying the spokes in their radial position, a key on each side mutually supporting and bracing each other, with the shoulder of the tenon resting upon the broad face of the keys, and secured laterally by the presence of the band $a''$, on each side of the spoke, and which are pressed against them by the spindle C. This spindle is secured rigidly to the inner centre, and passes through the hub to the outside, the protruding end of which is furnished with a nut, $b'$, by which the two centres are firmly screwed together, and thus the spokes and hub are laterally secured from all possibility of getting loose, and should the spokes ever get loose they are easily and quickly tightened by screwing up the nut, and thus bring the centres again closer against the tenons.

The advantage of a wheel constructed in this manner is that it is stronger than one constructed in the ordinary way, as the tenon is self-bracing or wedging from the shoulder down to the middle at the point $x$, and from the end upward to the same point; hence by this means there can be no possible lateral movement or vibration of the tenon, as it is wedging downward from the shoulder on one side, and at the same time wedging upward from the end on the opposite side, thus acting diagonally and reversely at once in whichever direction the strain may be exerted upon the spoke. The wheel is much lighter and more durable than the ordinary iron hub, for in that the tenon is held in an iron mortise which soon wears upon the wood by its superior hardness and unyielding character; hence the spokes soon get loose. But in this wheel the tenons are held in wood, therefore there can be no unequal wearing of the tenon and mortise, and should they, by any cause, get loose, they are easily tightened by the nut and by driving in one or two new keys. The spindle being journalled in boxes in the manner as described, can be at all times kept close by screwing up the caps of the boxes as they may wear away, and thus prevent any noise arising from a looseness of the wheel and axle, and when worn out the spindle can be screwed from the wheel and replaced by a new one. Wheels attached to a carriage in this way give free and easy access to the axle or spindle for the purpose of oiling. A wheel thus constructed can be applied to an ordinary carriage by taking out the spindle and replacing it with a box fitting the axle. In this case a flange should be constructed on the larger end of the box, and the smaller end allowed to protrude from the hub, and furnished with a nut by which the two centres may be screwed together so as to allow the spindle to be rigid or stationary and the wheel turn upon it. By means of the coupling O and adjusting screws O', by which the two sections of the reach are connected together, the reach can be lengthened out, and thereby keep the several links by which the front and hind wheels are connected properly tightened, so as to operate the wheels readily and with uniformity.

What I claim as my improvement, and desire to secure by Letters Patent, is—

1. The centres $a'$, constructed with radial arms $b$, in combination with the bands B, spoke $d$, and keys $f$, substantially as and for the purpose described.

2. The wheel B, spindle C, as arranged, in combination with the stays D, boxes E E', for the purpose and in the manner as set forth.

3. The cross-rail K, arm L, links L', and brackets M, in combination with the stay D and screw G, as and for the purpose substantially as herein described.

4. The stay D, screw-pins I G, in combination with the spindle C, axle-tree A, substantially as and for the purpose set forth.

5. The adjusting-screws O', coupling O, and reach K', arranged substantially as and for the purpose set forth.

JAMES HATFIELD.

Witnesses:
W. H. BURRIDGE,
A. P. TYLER.